US012673698B2

(12) United States Patent
Bandi et al.

(10) Patent No.: US 12,673,698 B2
(45) Date of Patent: Jul. 7, 2026

(54) SYSTEM AND METHOD TO VALIDATE MARSHALING INSTRUCTIONS RECEIVED BY INFRASTRUCTURE ENABLED MARSHALING SYSTEM

(71) Applicant: Ford Motor Company, Dearborn, MI (US)

(72) Inventors: Krishna Bandi, Novi, MI (US);
Meghna Menon, Ann Arbor, MI (US);
Mario Anthony Santillo, Canton, MI
(US); Gregory P. Linkowski,
Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 258 days.

(21) Appl. No.: 18/518,098

(22) Filed: Nov. 22, 2023

(65) Prior Publication Data

US 2024/0182070 A1 Jun. 6, 2024

Related U.S. Application Data

(60) Provisional application No. 63/430,506, filed on Dec. 6, 2022.

(51) Int. Cl.
| | |
|---|---|
| *B60W 60/00* | (2020.01) |
| *B60W 30/09* | (2012.01) |
| *B60W 30/095* | (2012.01) |
| *B60W 50/14* | (2020.01) |
| *G08G 1/0967* | (2006.01) |
(Continued)

(52) U.S. Cl.
CPC ........ B60W 60/0015 (2020.02); B60W 30/09 (2013.01); B60W 30/0956 (2013.01); B60W 50/14 (2013.01); G08G 1/096725 (2013.01); G08G 1/096775 (2013.01); G08G 1/164 (2013.01); H04W 4/44 (2018.02); B60W 2556/40 (2020.02); B60W 2556/45 (2020.02)

(58) Field of Classification Search
CPC ............ B60W 60/0015; B60W 30/09; B60W 30/0956; B60W 50/14; B60W 2556/40; B60W 2556/45; H04W 4/44; G08G 1/096725; G08G 1/096775; G08G 1/164
See application file for complete search history.

(56) References Cited

U.S. PATENT DOCUMENTS

| | | | | |
|---|---|---|---|---|
| 11,056,006 B2 * | 7/2021 | Mergenthaler | ........ | B60W 30/06 |
| 11,400,920 B2 * | 8/2022 | Yoon | ..................... | B60W 30/06 |
| 11,427,188 B2 * | 8/2022 | Sugano | .................. | G08G 1/141 |
(Continued)

FOREIGN PATENT DOCUMENTS

EP 4073780 10/2022

*Primary Examiner* — Hussein Elchanti
(74) *Attorney, Agent, or Firm* — Burris Law, PLLC

(57) ABSTRACT

A method includes calculating, by a vehicle system, a pose information for a vehicle having the vehicle system, determining, by the vehicle system, whether the calculated pose information matches that of a vehicle pose information received from an infrastructure system, updating, by the vehicle system, a current pose of the vehicle based on the calculated pose information, transmitting, by the vehicle system, a notification regarding the inaccurate pose information to the infrastructure system, and controlling, by the vehicle system, movement of the vehicle based on a stored marshaling route until a stop condition is satisfied.

20 Claims, 9 Drawing Sheets

(51) Int. Cl.
    *G08G 1/16*          (2006.01)
    *H04W 4/44*        (2018.01)

(56)              References Cited

U.S. PATENT DOCUMENTS

| | | | |
|---|---|---|---|
| 11,440,537 B2 * | 9/2022 | Kim | ..................... G01C 21/005 |
| 2005/0187677 A1 | 8/2005 | Walker | |
| 2006/0026017 A1 | 2/2006 | Walker | |
| 2019/0141467 A1 | 5/2019 | Breed | |
| 2019/0205115 A1 | 7/2019 | Gomes | |
| 2020/0209877 A1 * | 7/2020 | Yoon | .................... G05D 1/0251 |
| 2020/0356786 A1 | 11/2020 | Hannah | |
| 2021/0009111 A1 * | 1/2021 | Kang | .................... B60W 30/06 |
| 2021/0162988 A1 * | 6/2021 | Kang | ............... B60W 60/0053 |
| 2021/0197801 A1 * | 7/2021 | Oh | ..................... B62D 15/0285 |
| 2021/0201680 A1 * | 7/2021 | Oh | ....................... G08G 1/0116 |
| 2021/0248386 A1 * | 8/2021 | Takato | ................... G06V 20/56 |
| 2021/0314748 A1 | 10/2021 | Cominetti et al. | |
| 2021/0385865 A1 | 12/2021 | Mueck et al. | |
| 2022/0038902 A1 | 2/2022 | Mueck | |
| 2022/0227367 A1 | 7/2022 | Kario et al. | |
| 2022/0266818 A1 * | 8/2022 | Masui | ................. B60W 30/06 |
| 2023/0145508 A1 | 5/2023 | Kaphengst et al. | |
| 2025/0324326 A1 * | 10/2025 | Calcev | ................. H04W 28/26 |

* cited by examiner

SYSTEM AND METHOD TO VALIDATE MARSHALING INSTRUCTIONS RECEIVED BY INFRASTRUCTURE ENABLED MARSHALING SYSTEM

CROSS-REFERENCE TO RELATED APPLICATION

This application claims the benefit of and priority to U.S. Provisional Application No. 63/430,506, filed on Dec. 6, 2022, and titled "SYSTEM AND METHOD TO VALIDATE MARSHALLING INSTRUCTIONS RECEIVED BY INFRASTRUCTURE ENABLED MARSHALLING SYSTEM", the contents of which are incorporated herein by reference in its entirety.

FIELD

The present disclosure relates to marshaling vehicles in a facility.

BACKGROUND

The statements in this section merely provide background information related to the present disclosure and may not constitute prior art.

Current standards, like those proposed by European Telecommunications Standards Institute (ETSI) or Society of Automotive Engineers (SAE), may not provide solutions for automatic vehicle on-boarding to a convoy and for marshaling/guiding one or more vehicles without utilizing a manual operator. Manual operator involvement for each vehicle can lead to delays in the vehicle marshaling, which can lead to delays of marshaling when the same vehicle desires to support multiple marshaling features, such as plant marshaling, depot marshaling, valet parking assist marshaling, electric vehicle charging marshaling, geo-fenced use-cases, etc. In addition, multiple synchronization process and communication technologies (e.g., wireless and/or wired communication technologies) may be required before a vehicle even begins marshaling.

SUMMARY

This section provides a general summary of the disclosure and is not a comprehensive disclosure of its full scope or all of its features.

The present disclosure provides a method comprising: calculating, by a vehicle system of a vehicle, a pose information for the vehicle along a marshaling route defined by a marshaling map; updating, by the vehicle system, a current pose position of the vehicle based on the calculated pose information; determining, by the vehicle system, whether the current pose position for the vehicle matches a calculated pose position for the vehicle received from an infrastructure system; transmitting, in response to a determined mismatch between the current pose position for the vehicle and the calculated pose position for the vehicle, a notification to the infrastructure system; and controlling, by the vehicle system, movement of the vehicle based on the marshaling route until a stop condition is satisfied; further comprising, receiving by the vehicle system, a vehicle marshaling map identifying the marshaling route for the vehicle within a marshaling zone and storing the vehicle marshaling map at the vehicle; wherein the current pose position is determined, by the vehicle system, using a marshaling algorithm of the vehicle; wherein controlling movement of the vehicle in response to a determined mismatch, by the vehicle system, comprises controlling movement of the vehicle along the marshaling route using vehicle pose updates from one or more onboard sensing systems; further comprising, in response to a detected collision hazard by the one or more onboard sensing systems, initiating by the vehicle system, a self e-stop; wherein the infrastructure system updates control instructions to other vehicles being marshaled along the marshaling route based on the detected collision hazard; and further comprising controlling movement of the vehicle along the marshaling route using vehicle pose updates from one or more onboard sensing systems in response to not receiving the calculated pose position from the infrastructure system.

The present disclosure also provides an infrastructure system configured to: transmit a vehicle marshaling map to a vehicle, the vehicle marshaling map defining a marshaling route; receive pose position updates from the vehicle; transmit to the vehicle, in response to the received pose position updates not matching an estimated pose position determined by a marshaling algorithm of the infrastructure system, an e-stop command; and update control commands to other vehicles traveling along the marshaling route in response to a failure to receive confirmation of an e-stop by the vehicle; wherein the pose position updates are determined by a vehicle system, using a marshaling algorithm of the vehicle; wherein movement of the vehicle along the marshaling route is controlled using vehicle pose updates from one or more onboard sensing systems of the vehicle in response to the pose position updates not matching the estimated pose position determined by the marshaling algorithm of the infrastructure system; wherein, in response to a detected collision hazard by the one or more onboard sensing systems, initiating by a vehicle system of the vehicle, a self e-stop; wherein the infrastructure system is further configured to update control instructions to other vehicles being marshaled along the marshaling route based on the detected collision hazard; and wherein the infrastructure system, in response to a continued failure to receive confirmation of the e-stop by the vehicle indicative of a communication failure, transmitting an alert to one or more operators.

The present disclosure further provides one or more non-transitory computer-readable media storing processor-executable instructions that, when executed by at least one processor, cause the at least one processor to: transmit a vehicle marshaling map to a vehicle, the vehicle marshaling map defining a marshaling route; receive pose position updates from the vehicle; transmit to the vehicle, in response to the received pose position updates not matching an estimated pose position determined by a marshaling algorithm of the infrastructure system, an e-stop command; and update control commands to other vehicles traveling along the marshaling route in response to a failure to receive confirmation of an e-stop by the vehicle; wherein the pose position updates are determined by a vehicle system, using a marshaling algorithm of the vehicle; wherein movement of the vehicle along the marshaling route is controlled using vehicle pose updates from one or more onboard sensing systems of the vehicle in response to the pose position updates not matching the estimated pose position determined by the marshaling algorithm of the infrastructure system; wherein, in response to a detected collision hazard by the one or more onboard sensing systems, initiating by a vehicle system of the vehicle, a self e-stop; wherein the processor-executable instructions, when executed by the at least one processor, cause the infrastructure system to update control instructions to other vehicles being marshaled along the marshaling route based on the detected collision hazard; wherein the processor-executable instructions, when executed by the at least one processor, cause the infrastructure system to, in response to a continued failure to receive confirmation of the e-stop by the vehicle indicative of a communication failure, transmit an alert to one or more operators; and wherein the processor-executable instructions, when executed by the at least one processor, cause the infrastructure system to determine the estimated pose position of the vehicle using one or more infrastructure sensors within a marshaling zone.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
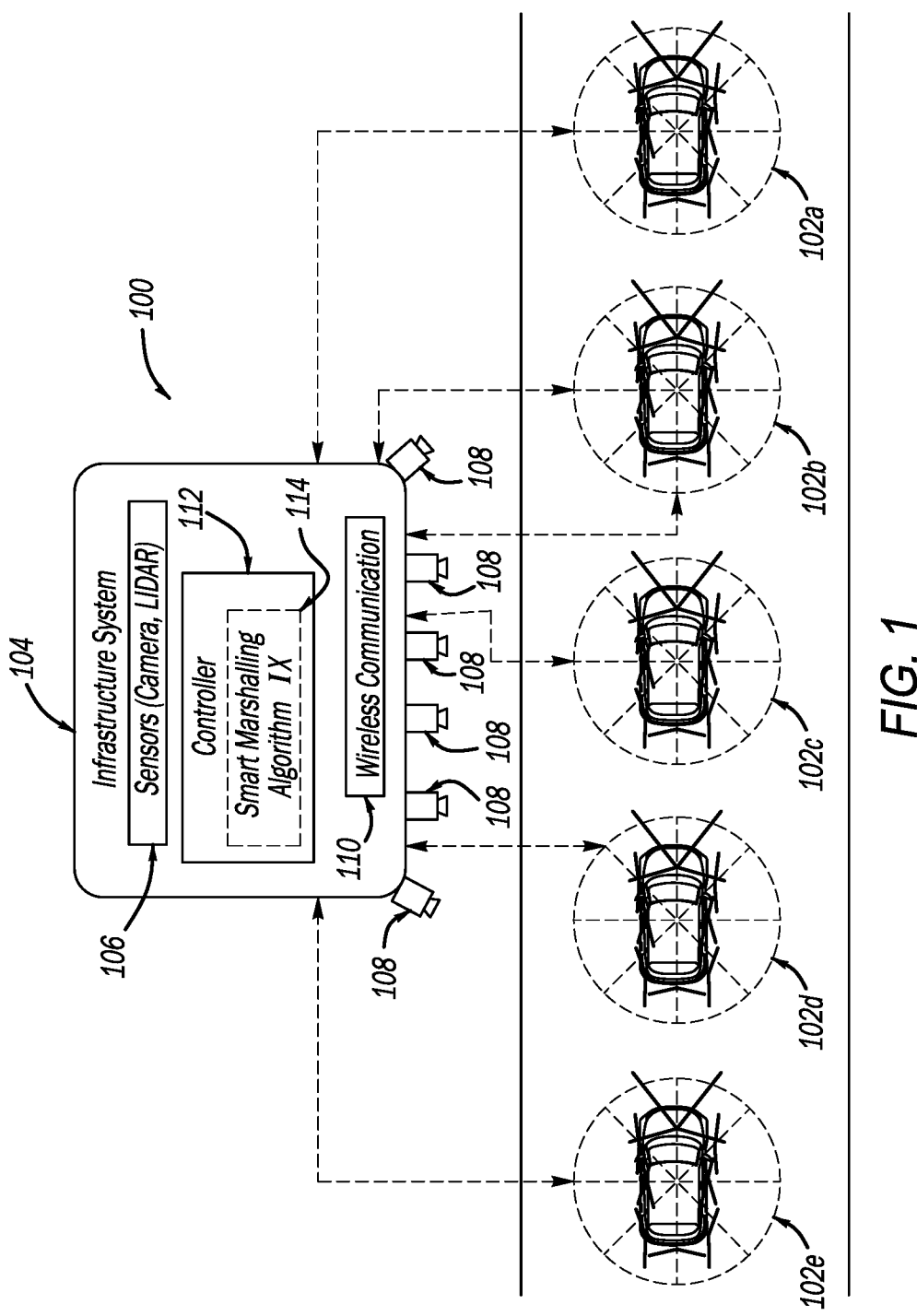
FIG. 1 illustrates a system for distribution of a fleet of vehicles in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide a means for validating marshaling instructions (e.g., instructions received by an infrastructure enabled marshaling system) and guide a vehicle during emergency/non-emergency e-stop. For example, in some situations the vehicle may not be able to receive the marshaling instructions. In some instances, thus, issues may exist in marshaling systems when the vehicle does not receive updated marshaling instructions. In non-limiting examples, such issues may occur: when an automatic vehicle marshaling (AVM) central server (e.g., an infrastructure system) is down or there is a processing delay for certain amount of time (e.g., there is a heavy processing load on the AVM central server); if a camera-lidar sensor (or other sensor or monitor) at an infrastructure is not able to detect or if there is a delay in detecting vehicles because of environment conditions factors (e.g., snow, heavy rain etc.); when there is a delay in wireless communication between the vehicle and infrastructure (e.g., delay caused by network congestion and/or packet delays); due to wireless delay in receiving the instructions, a vehicle may perform non-emergency stop and the infrastructure system may not know, which could potentially lead to congestion flow in the marshaling system; and the infrastructure system sends an emergency e-stop and the vehicles not related to e-stop may end-up in front/rear end collisions during the marshaling. With the systems and methods described herein, the likelihood of collision between autonomously marshaled vehicles is reduced or eliminated (e.g., avoiding collisions during the marshaling convoy as a result of sending an emergency e-stop instruction) during these and other situations.

In some examples, a vehicle system implements an algorithm/model that validates/verifies the received marshaling messages over wireless communications using a marshaling map for the vehicle, where the map was received by the vehicle when the vehicle was on-boarded to the marshaling convoy. In particular, when the vehicle receives marshaling instructions, the vehicle down-selects the respective vehicle instructions (e.g., vehicle container of park control infrastructure message (PCIM)) in some examples. For example, the infrastructure system sends marshaling instructions (to all vehicles the infrastructure is guiding or marshaling) within a single message, such as by broadcasting the message. The vehicle down-selects based on the vehicle identifier of the PCIM message, which message is intended for the vehicle. The vehicle then validates the instructions received from the infrastructure system with the on-board marshaling map for the vehicle using a marshaling matching algorithm regarding a pose position of the vehicle as described in more detail herein. That is, the algorithm determines if the instructions and the pose position match. If it does not match, the vehicle system informs the infrastructure system instead of abruptly triggering an emergency stop of the vehicle. If the algorithm determines a match, then the marshaling algorithm continues updating the respective pose position of the vehicle with respect to the marshaling map for the vehicle.

Accordingly, in various examples, the marshaling algorithm employs the pose position of the vehicle when an updated pose position is not received from the infrastructure system. In this case, the algorithm further employs other pose information of the vehicle and on-board sensors to avoid interfering with other objects and does not trigger the e-stop until, for example, the vehicle meets certain threshold criteria. The marshaling algorithm in some examples performs validation and verification of the received emergency e-stop calculated from the vehicle versus calculated by the infrastructure system utilizing the PCIM and park control vehicle message (PCVM).

Referring now to FIG. 1, there is shown a system 100 (e.g., a portion of an automated vehicle marshaling (AVM) system) for the distribution of autonomous and semi-autonomous vehicles 102 (e.g., one or more vehicles 102a-102e) for example, situated in a factory floor and which is capable of validating marshaling instructions as described in more detail herein. The system 100 includes an infrastructure system 104. The infrastructure system 104 further includes a sensor component 106 that communicates with a set of infrastructure sensors 108 such as, for example, one or more cameras, lidar, radar, and/or ultrasonic devices. The sensors 108 monitor the movement of the vehicles 102 as the vehicles 102 move through, for example, the factory floor. The infrastructure system 104 also includes a wireless communication component 110 that provides for communication between the infrastructure system 104 and the vehicles 102. Additionally, the infrastructure system 104 includes an infrastructure controller 112. The infrastructure controller 112 is configured to centrally control the operation of each of the vehicles 102. For example, the operation of each of the vehicles 102 includes propulsion, braking, and steering of the vehicles 102. It is understood that the infrastructure controller 112 may be disposed within the infrastructure system 104 or externally located relative to the infrastructure system 104. The infrastructure controller 112 includes a smart marshaling algorithm 114 (e.g., a smart marshaling algorithm for infrastructure (IX)) that is configured to facilitate the communication of the infrastructure controller 112 with a vehicle controller 200 associated with each of the vehicles 102a-102e to validate marshaling instructions in some examples.

Figure 2:
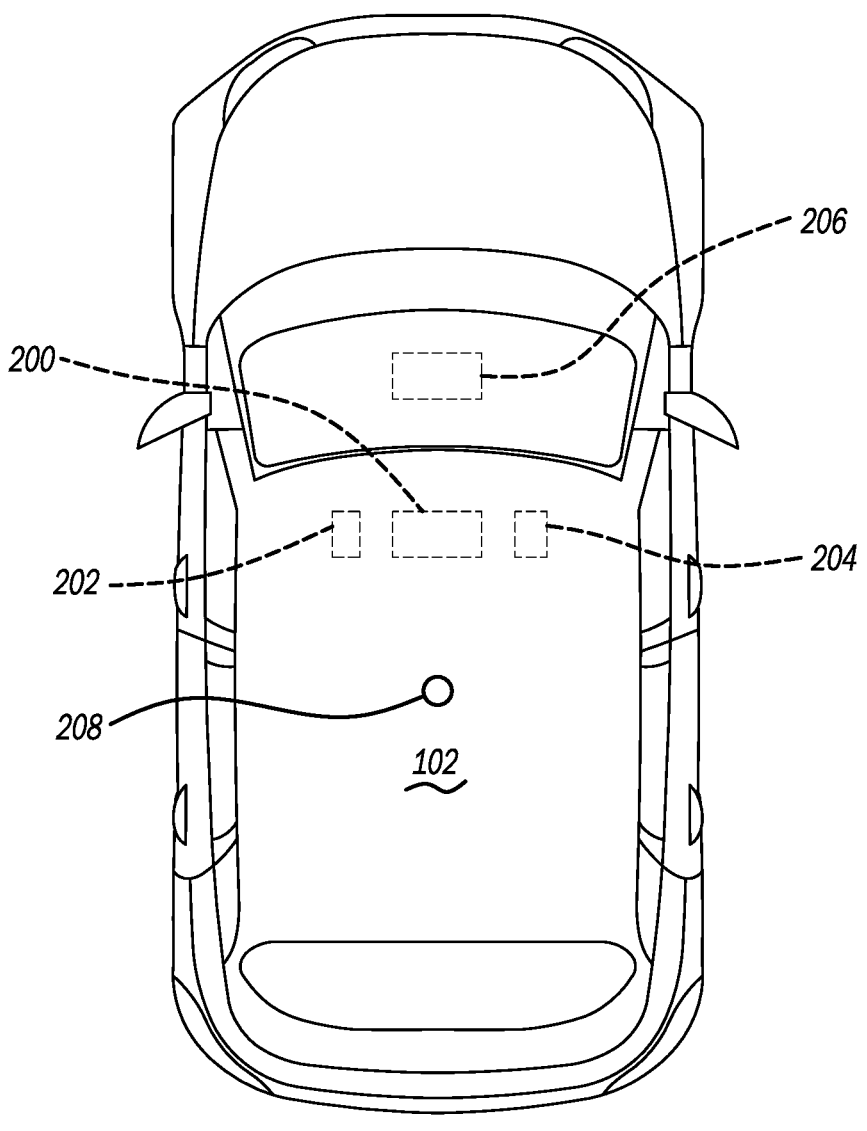
FIG. 2 illustrates an example vehicle distributed by the system shown in FIG. 1 in accordance with various implementations.

Referring further to FIG. 2, in various forms, the vehicles 102 may be powered in a variety of ways, for example, with an electric motor and/or an internal combustion engine. The vehicles 102 may be any type of vehicle powered by an electric motor and/or an internal combustion engine such as a car, a truck, a robot, a plane and/or a boat, as non-limiting examples. Each of the vehicles 102 include a vehicle controller 200, one or more actuators 202, a plurality of onboard sensors 204, and a human machine interface (HMI) 206. Each of the one or more vehicles 102a-102e also have a reference point 208, that is, a specified point within the space defined by a vehicle body, for example, a geometrical center point at which respective longitudinal and lateral center axes of a particular vehicle of the one or more vehicles 102a-102e intersect. The reference point 208 identifies the location of the particular vehicle of the one or more vehicles 102a-102e, for example, a point at which the vehicles 102 are located as the vehicles 102 navigate toward a waypoint.

The vehicle controller 200, in some examples, is configured or programmed to control the operation of the one or more vehicle 102a-102e brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle controller 200, as opposed to a human operator, is to control such operations. It is understood that any of the operations associated with the vehicles 102 may be facilitated via an automated, a semi-automated, or a manual mode. For example, the automated mode may facilitate for any of the operations to be fully controlled by the vehicle controller 200 without the aid of a user. As another example, the semi-automated mode may facilitate for any of the operations to be at least partially controlled by the vehicle controller 200 and/or the user. As a further example, the manual mode may facilitate for any of the operations to be fully controlled by the user.

The vehicle controller 200 includes or may be communicatively coupled to (e.g., via a vehicle communications bus) one or more processors, for example, controllers or the like included in the vehicles 102 for monitoring and/or controlling various vehicle controllers, such as a powertrain controller, a brake controller, a steering controller, etc. The vehicle controller 200 is generally arranged for communications on a vehicle communication network that can include a bus in the vehicle 102 such as a controller area network (CAN) or the like, and/or other wired and/or wireless mechanisms.

The vehicle controller 200 transmits messages, via a vehicle network, to various devices in the vehicles 102 and/or receives messages from the various devices, for example, the one or more actuators 202, the HMI 206, etc.

Alternatively, or additionally, in cases where the vehicle controller 200 includes multiple devices, the vehicle communication network is utilized for communications between devices represented as the vehicle controller 200 in this disclosure. Further, as discussed below, various other controllers and/or sensors provide data to the vehicle controller 200 via the vehicle communication network.

In addition, the vehicle controller 200 is configured for communicating through a wireless vehicular communication interface with other traffic objects (e.g., vehicles, infrastructures, pedestrians, etc.), such as, via a vehicle-to-vehicle communication network. The vehicle controller 200 is also configured for communicating through a vehicle-to-infrastructure communication network, such as communicating with the infrastructure controller 112 of the infrastructure system 104. The vehicular communication network represents one or more mechanisms by which the vehicle controller 200 of the vehicles 102 communicate with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 202 are implemented via circuits, chips, or other electronic and/or mechanical components that can actuate various vehicle subsystems in accordance with appropriate control signals. The actuators 202 may be used to control braking (e.g., emergency/non-emergency e-stop), acceleration, and/or steering of the vehicles 102. The vehicle controller 200 can be programmed to actuate the vehicle actuators 202 including propulsion, steering, and/or braking based on the planned acceleration or deceleration of the vehicles 102.

The sensors 204 include a variety of devices to provide data to the vehicle controller 200. For example, the sensors 204 may include object detection sensors such as lidar sensor(s) disposed on or in the vehicles 102 that provide relative locations, sizes, and shapes of one or more targets surrounding the vehicles 102, for example, additional vehicles, bicycles, pedestrians, robots, drones, etc., travelling next to, ahead, and/or behind the vehicles 102. As another example, one or more of the sensors can be radar sensors affixed to one or more bumpers of the vehicles 102 that may provide locations of the target(s) relative to the location of each of the vehicles 102.

The object detection sensors may include a camera sensor, for example, to provide a front view, side view, rear view, etc., providing images from an area surrounding the vehicles 102. For example, the vehicle controller 200 may be programmed to receive sensor data from a camera sensor(s) and to implement image processing techniques to detect a road, infrastructure elements, etc. The vehicle controller 200 may be further programmed to determine a current vehicle location based on location coordinates, for example, GPS coordinates, received from the vehicles 102 and indicative of a location of the vehicles 102 from a GPS sensor.

The HMI 206 is configured to receive information from a user, such as a human operator, during operation of the vehicles 102. Moreover, the HMI 206 is configured to present information to the user, such as, an occupant of one or more of the vehicles 102. In some variations, the vehicle controller 200 is programmed to receive destination data, for example, location coordinates, from the HMI 206.

Accordingly, the vehicles 102 can be autonomously guided toward a waypoint using a combination of the infrastructure sensors 108 and the vehicle sensors (e.g., the onboard sensors 204). Routing can be done using vehicle location, distance to travel, queue in line for vehicle marshaling, etc. Vehicles 102 requiring additional charge/fuel can be prepped ahead of joining the queue. Other vehicles 102 destined to a particular waypoint operate in the same way, so that movement of an entire fleet can be coordinated. The movements of the entire fleet are coordinated through a central fleet-management system that directs all traffic and logistics from an assembly plant to the waypoint. For example, the entire fleet can be organized in a pre-sorted order.

The centralized fleet-management application in various examples has complete knowledge of the vehicles 102 in its control (e.g., current location, destination, special notes, etc.), which adds accountability and traceability to the distribution process. The fleet-management is coordinated within and/or across sites to optimize delivery timing of each of the one or more vehicles 102a-102e to the waypoint. Several logistics applications can be used, which may involve a combination of an infrastructure system integrated with a traffic-management algorithm to queue and deconflict vehicles in real-time. Accordingly, the fleet-management application queues vehicles 102 based on unique characteristics (how far does a particular vehicle of the one or more vehicles 102a-102e need to travel, what traffic is along the route, when does the particular vehicle of the one or more vehicles 102a-102e need to get to a particular location to line up in the correct order, etc.).

Figure 3:
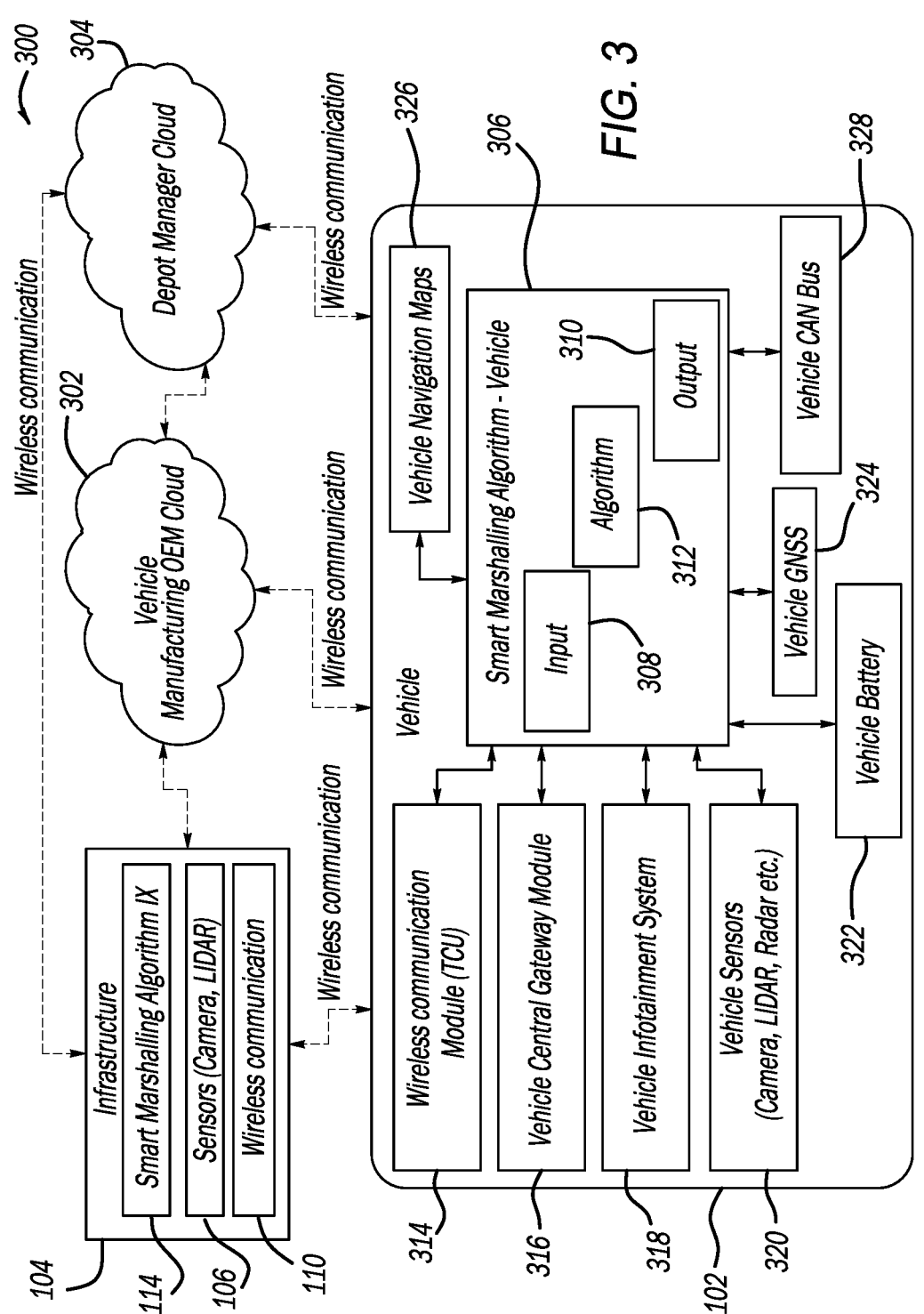
FIG. 3 illustrates an example AVM system in accordance with various implementations.

The system 100, and in particular the infrastructure system 104, is operable with or forms part of an AVM system 300 as shown in FIG. 3 in some examples. In one or more examples, the AVM system generally includes a vehicle manufacturing original equipment manufacturer (OEM) cloud-based system ("vehicle manufacturing OEM cloud" in figures, "vehicle OEM system" hereinafter), a depot manager cloud based system ("depot manager cloud" in figures, "depot manager system" hereinafter), and a vehicle system ("vehicle" in figures) as described in more detail below, where the various systems are in communication with each other via one or more wireless communication links. In one form, one or more different wireless communication protocols may be employed for establishing wireless communication between the systems (e.g., cellular, TCP/IP, V2X protocol, I2X protocol, among others).

The vehicle OEM system may be provided at the same and/or different location than that of the infrastructure system and/or the depot manager system. The vehicle OEM system is configured to store data related to each vehicle manufactured by the OEM. This information may include, but is not limited to, a vehicle identification number, data related to components installed in the vehicle (e.g., a bill of material with part numbers), one or more software-based tasks to be performed on the vehicle, such as software configurations, diagnostics test to be performed, etc.). In one form, the vehicle OEM system is configured to remotely control the vehicle utilizing, for example, I2X communication (e.g., the on-boarding, re-onboarding, off-boarding sessions messages). More particularly, the vehicle OEM system is configured to: remotely activate/wake-up the vehicle if it is in a power-off state; activate and deactivate the AVM application on the vehicle; if the infrastructure system and/or depot manager system are not able to communicate with the vehicle, the infrastructure/depot manager system(s) may communicate with the vehicle by way of the vehicle OEM system, thus the vehicle OEM system may act as an in-between interface. The vehicle OEM system may include controllers, computing devices, servers, modems, and/or other components for performing the various functions described here in.

The depot manager system also may be provided at the same and/or different location than that of the infrastructure system and/or the vehicle OEM system. The depot manager system is configured to: provide instructions for where each vehicle needs to be for day-to-day or hourly activities; trigger activation/deactivation of AVM application for the vehicles; receive updates on activities performed by the vehicle from the infrastructure system; and after activities of the day, provide the activity of each vehicle to the infrastructure system such as loading, unloading, charging, etc. Based on the information from the depot manager system, the infrastructure system is configured to guide the vehicles to marshal autonomously for each activity. After the activity is accomplished, the infrastructure system notifies the depot marshaling system of the status of each vehicle. The depot manager system may include controllers, computing devices, servers, modems, and other components.

In an example application, the infrastructure system is provided in a predefined area, such as, but not limited to, a manufacturing facility, an indoor/outdoor parking facility. In one form, the infrastructure system includes a smart marshaling algorithm ("infrastructure marshaling algorithm" hereinafter), multiple sensors (e.g., camera, LIDAR, etc.) for detecting and determining position of objects, such as vehicles at the predefined area, and a wireless communication module ("wireless communication" in figures) for establishing wireless communication with the vehicle as part of infrastructure-to-vehicle communication link. It should be readily understood that the infrastructure system may include other modules and/or components for performing the various operations herein, such as a communication module for communicating with the other system (e.g., vehicle manufacturing OEM system and the depot manager system).

In one form, among other modules/components, as described in more detail below, the vehicle includes a wireless communication module, a vehicle central gateway module, a vehicle infotainment system, vehicle sensors disposed at the vehicle, vehicle battery, vehicle global navigation satellite system (GNSS) antenna ("vehicle GNSS" in figures), a vehicle controller area network (CAN) bus, a vehicle navigation map module ("vehicle navigation map" in figures), and a smart marshaling algorithm ("vehicle marshaling algorithm" hereinafter). The wireless communication module is configured to establish wireless communication with devices/systems outside of the vehicle. The vehicle central gateway module is configured to support communication between modules in the vehicle, the vehicle CAN bus and the wireless communication module. Among other devices, the vehicle infotainment system may include speakers, monitors, and/or microphones, to receive information from and provide information to a user. The vehicle sensors may include, but is not limited to, cameras, lidar, radar. In one form, data from the sensors can be employed to determine the environment around the vehicle such as markings on the ground the vehicle is traveling on, objects about the vehicle, etc. The vehicle navigation map module is configured to store maps, routing and/or localization information received, among other data related to navigating the vehicle.

More particularly, the AVM system 300 includes the vehicle manufacturing cloud 302, the depot manager cloud 304, the infrastructure 104, and the vehicle 102. The vehicle manufacturing cloud 302 operates as the central cloud system that manages and/or facilitates any manufacturing process associated with the vehicle 102. The vehicle manufacturing cloud 302 wirelessly communicates with the depot manager cloud 304 and the infrastructure 104. The vehicle manufacturing cloud 302 also wirelessly communicates with the vehicle 102.

The vehicle manufacturing cloud 302 includes may include an AVM algorithm in some examples in addition to or instead of the smart marshaling algorithm 114 of the infrastructure 104. The smart marshaling algorithm 114 and/or the AVM algorithm processes status information associated with at least the vehicle 102 of the one or more vehicles. It is understood that the smart marshaling algorithm 114 and/or AVM algorithm processes status information associated with each vehicle of the one or more vehicles (e.g., the vehicle 102). The vehicle manufacturing cloud 302 is configured to cause the infrastructure 104 to monitor the progression of the one or more vehicles (e.g., the vehicle 102) as the vehicle(s) progress through a factory floor or parking lot, for example. The vehicle manufacturing cloud 302 is also configured to cause the infrastructure 104 to communicate with the one or more vehicles. For example, the vehicle manufacturing cloud 302 utilizes the smart marshaling algorithm 114 and/or the AVM algorithm to send instructions to the infrastructure 104 and/or to process information received from the infrastructure 104. The vehicle manufacturing cloud 302 is also configured to cause the depot manager cloud 304 to facilitate a depot operations related to one or more vehicles. For example, the vehicle manufacturing cloud 302 utilizes the smart marshaling algorithm 114 and/or the AVM algorithm 112 to send instructions to the depot manager cloud 304 and/or to process information received from the depot manager cloud 304.

The vehicle manufacturing cloud 302 is further configured to communicate directly with the one or more vehicles to cause the one or more vehicles to start, stop, or pause progression through a factory floor or parking lot, for example. The vehicle manufacturing cloud 302 is further configured to control a marshaling speed (and stopping) of the one or more vehicles as the one or more vehicles travel across through the factory floor or parking lot, for example.

The infrastructure 104 includes the smart marshaling algorithm 114 and with the sensors 106, allow for communication between one or more infrastructures (e.g., the infrastructure 104) and the one or more vehicles. For example, the infrastructure 104 may utilize GPS, Wi-Fi, satellite, 3G/4G/5G, and/or Bluetooth™ to communicate with the one or more vehicles via the wireless communication 110. The infrastructure 104 utilizes the smart marshaling algorithm 114 in some examples to process and send information to the vehicle manufacturing cloud 302 and/or to process information received from the vehicle manufacturing cloud 302. As another example, the infrastructure 104 utilizes the smart marshaling algorithm 114 to process and send information directly to the vehicle 102 and/or to process information received from the vehicle 102. It is understood that the infrastructure 104 can forward instructions received from the vehicle manufacturing cloud 302 to the vehicle 102. However, it is also understood that the infrastructure 104 can send instructions to the vehicle 102 directly.

The vehicle 102 includes a smart marshaling algorithm 306 (that includes an input 308, and output 310, and an algorithm component 312), a wireless communication module illustrated as a wireless transmission module 314, a vehicle central gateway module 316, a vehicle infotainment system 318, one or more vehicle sensors 320, a vehicle battery 322, a vehicle global navigation satellite system 324, vehicle navigation maps 326, and a controller area network (CAN) vehicle bus 328. The wireless communication module 314 may be a transmission control unit (TCU). The wireless transmission module 314 includes one or more sensors that are configured to gather data and send signals to other components of the vehicle 102. The one or more sensors of the wireless transmission module 314 may include a vehicle speed sensor (not shown) configured to determine a current speed of the vehicle 102; a wheel speed sensor (not shown) configured to determine if the vehicle 102 is traveling at an incline or a decline; a throttle position sensor (not shown) determines if a downshift or upshift of one or more gears associated with the vehicle 102 is required in a current status of the vehicle 102; and/or a turbine speed sensor (not shown) configured to send data associated with a rotational speed of a torque converter of the vehicle 102. The wireless transmission module 314 communicates information, gathered by the one or more sensors, to the smart marshaling algorithm 306. In one embodiment, the smart marshaling algorithm 306 may be disposed as a component within the wireless transmission module 314. For example, the vehicle 102 utilizes the smart marshaling algorithm 306 to process and send information gathered by the one or more sensors to the infrastructure 104. As another example, the vehicle 102 utilizes the smart marshaling algorithm 306 to process and send information gathered by the one or more sensors to the vehicle manufacturing cloud 302 directly. The smart marshaling algorithm 306 is configured to communicate information and/or instructions to the wireless transmission module 314 received from the infrastructure 104 and/or the vehicle manufacturing cloud 302.

The vehicle central gateway module 316 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 328. The vehicle central gateway module 316 is configured to distribute data communicated to the vehicle central gateway module 316 by each of the various domain bus systems to other components of the vehicle 102. The vehicle central gateway module 316 is also configured to distribute information received from the smart marshaling algorithm 306 to the various domain bus systems. The vehicle central gateway module 316 is further configured to send information to the smart marshaling algorithm 306 received from the various domain bus systems. For example, the vehicle 102 utilizes the smart marshaling algorithm 306 to process and send information received from the vehicle central gateway module 316 to the infrastructure 104. As another example, the vehicle 102 utilizes the smart marshaling algorithm 306 to process and send information received from the vehicle central gateway module 316 to the vehicle manufacturing cloud 302 directly. The smart marshaling algorithm 306 is configured to communicate information and/or instructions to the vehicle central gateway module 316 received from the infrastructure 104 and/or the vehicle manufacturing cloud 302.

The vehicle infotainment system 318 is a system that delivers a combination of information and entertainment content and/or services to a user of the vehicle 102. It is understood that the vehicle infotainment system 318 can deliver only entertainment content to the user of the vehicle 102, in some examples. It is also understood that the vehicle infotainment system 318 can deliver information services to anyone associated with the vehicle 102, in other examples. As an example, the vehicle infotainment system 318 includes built-in car computers that combine one or more functions, such as digital radios, built-in cameras, and/or televisions. The vehicle infotainment system 318 communicates information associated with the built-in car computers or processors to the smart marshaling algorithm 306. For example, the vehicle 102 utilizes the smart marshaling algorithm 306 to process and send information received from the vehicle infotainment system 318 to the infrastructure 104. As another example, the vehicle 102 utilizes the remote start wake-up algorithm 113b to process and send information received from the vehicle infotainment system 318 to the vehicle manufacturing cloud 302 directly. The smart marshaling algorithm 306 is configured to communicate information and/or instructions to the vehicle infotainment system 122 received from the infrastructure 104 and/or the vehicle manufacturing cloud 302.

The one or more vehicle sensors 320 may be, for example, one or more of cameras, lidar, radar, and/or ultrasonic devices. For example, ultrasonic devices utilized as the one or more vehicle sensors 320 emit a high frequency sound wave that hits an object (e.g., a wall or another vehicle) and is then reflected back to the vehicle 102. Based on the amount of time it takes for the sound wave to return to the vehicle 102, the vehicle 102 can determine the distance between the one or more vehicle sensors 320 and the object. As another example, camera devices utilized as the one or more vehicle sensors 320 provide a visual indication of a space around the vehicle 102. As an additional example, radar devices utilized as the one or more vehicle sensors 320 emit electromagnetic wave signals that hit the object and is then reflected back to the vehicle 102. Based on the amount of time it takes for the electromagnetic waves to return to the vehicle 102, the vehicle 102 can determine a range, velocity, and angle of the vehicle 102 relative to the object.

The one or more vehicle sensors 320 communicate information associated with the position and/or distance at which the vehicle 102 is relative to the object to the smart marshaling algorithm 306. For example, the vehicle 102 utilizes the smart marshaling algorithm 306 to process and send information received from the one or more vehicle sensors 320 to the infrastructure 104. As another example, the vehicle 102 utilizes the smart marshaling algorithm 306 to process and send information received from the one or more vehicle sensors 320 to the vehicle manufacturing cloud 302 directly. The smart marshaling algorithm 306 is configured to communicate information and/or instructions to the one or more vehicle sensors 320 received from the infrastructure 104 and/or the vehicle manufacturing cloud 302.

The vehicle battery 322 is controlled by a battery management system (not shown) that provides instructions to the vehicle battery 322. For example, the battery management system provides instructions to the vehicle battery 322 based on a temperature of the vehicle battery 322. However, it is understood that the battery management system may provide instructions to the vehicle battery 322 based on any measure associated with the vehicle battery 322 such as power state of the vehicle 102, a time period of at least one day that the vehicle 102 is in an off-state, or a combination thereof. The battery management system ensures acceptable current modes of the vehicle battery 322. For example, the acceptable current modes protect against overvoltage, overcharge, and/or overheating of the vehicle battery 322. As another example, the temperature of the vehicle battery 322 indicates to the battery management system whether any of the acceptable current modes are within acceptable temperate ranges. The battery management system associated with the vehicle battery 322 communicates information associated with the temperature of the vehicle battery 322 to the smart marshaling algorithm 306. For example, the vehicle 102 utilizes the smart marshaling algorithm 306 to process and send information received regarding the vehicle battery 322 to the infrastructure 104. As another example, the vehicle 102 utilizes the smart marshaling algorithm 306b to process and send information regarding the vehicle battery 322 to the vehicle manufacturing cloud 302 directly. The smart marshaling algorithm 306 is configured to communicate information and/or instructions to the vehicle battery 322 received from the infrastructure 104 and/or the vehicle manufacturing cloud 302.

The vehicle GNSS 324 is configured to communicate with satellites so that the vehicle 102 can determine a specific location of the vehicle 102. The vehicle navigation maps 326 can display, via a display screen (not shown), the specific location of the vehicle 102 to the user. The vehicle GNSS 324 communicates geographical information associated with the vehicle 102 to the smart marshaling algorithm 306. For example, the vehicle 102 utilizes the smart marshaling algorithm 306 to process and send information received from the vehicle GNSS 324 to the infrastructure 104. As another example, the vehicle 102 utilizes the smart marshaling algorithm 306 to process and send information from the vehicle GNSS 324 to the vehicle manufacturing cloud 302 directly. The smart marshaling algorithm 306 is configured to communicate information and/or instructions to the vehicle GNSS 324 received from the infrastructure 104 and/or the vehicle manufacturing cloud 302. As another example, the vehicle 102 utilizes the smart marshaling algorithm 306 to process and send information associated with the vehicle navigation maps 326 to the infrastructure 104. As another example, the vehicle 102 utilizes smart marshaling algorithm 306 to process and send information from the vehicle navigation maps 326 to the vehicle manufacturing cloud 302 directly. The smart marshaling algorithm 306 is configured to communicate information and/or instructions to the vehicle navigation maps 326 received from the infrastructure 104 and/or the vehicle manufacturing cloud 302. In some examples, the vehicle navigation maps 326 include vehicle marshaling maps (stored, e.g., in a database) as described in more detail herein.

The depot manager cloud 304 wirelessly communicates with a user device such as a mobile device, a display panel, and/or a computer. The vehicle 102 also configured to wirelessly communicate directly with the user device. For example, a user engages with the user device via an application that organizes any information and/or instructions received from a vehicle customer web-portal account and/or the vehicle 102. As another example, the user may send one or more instructions to the vehicle customer web-portal account.

Figure 4:
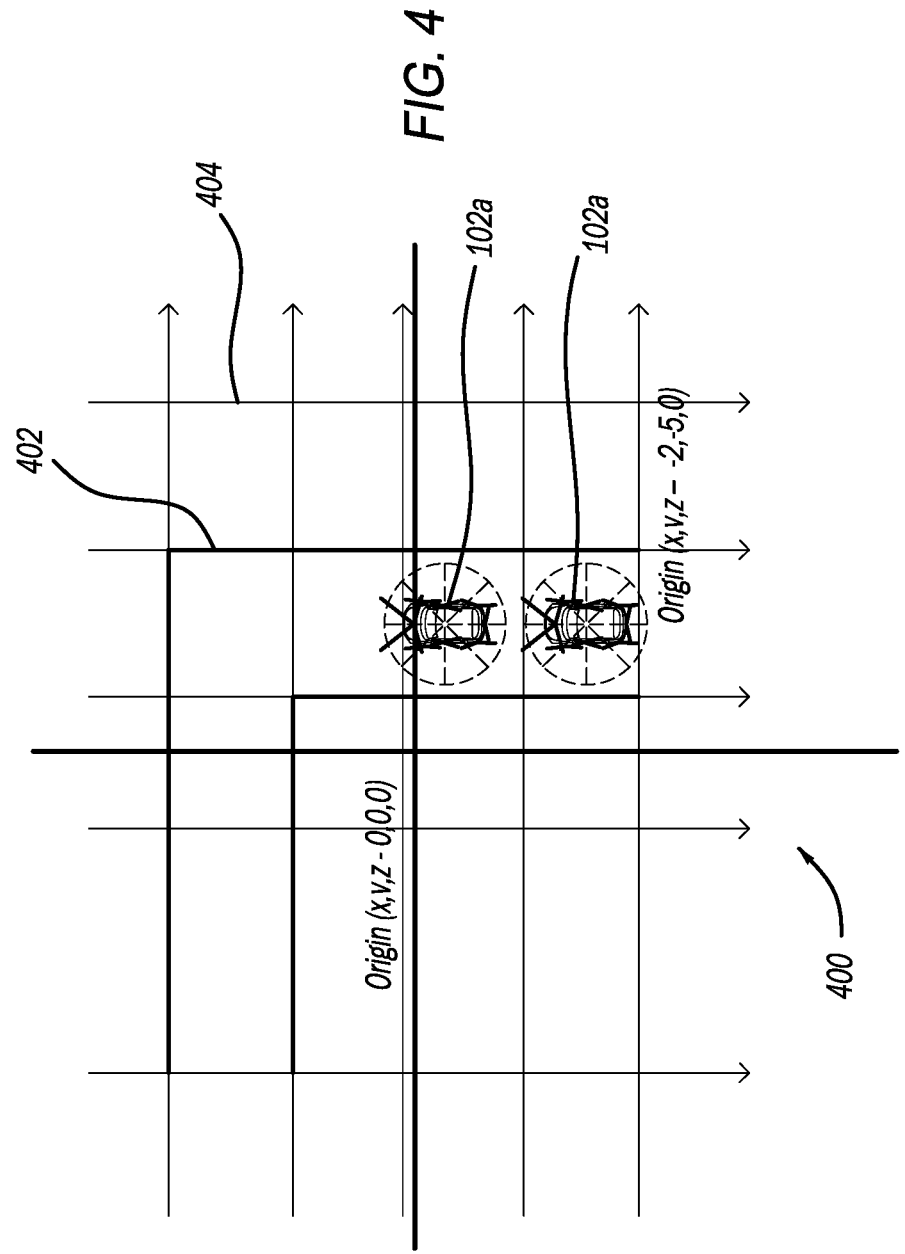
FIGS. 4-7 illustrate a marshaling validation process by a vehicle system in accordance various implementations.

FIGS. 4-7 shows the engagement of the vehicle 102 with the infrastructure 104 in an instance wherein the vehicle 102 is wirelessly communicative with the infrastructure 104 and illustrates validation of marshaling instructions in one example. With reference first to FIG. 4, the vehicle 102 receives the vehicle's marshaling scenario map 400 during an activation/on-boarding session onto an autonomous marshaling zone 402. The vehicle 102 stores this information onto a vehicle marshaling database within the vehicle 102, such as storing the marshaling scenario map defined by a matrix grid 404.

Thus, FIG. 4 illustrates a vehicle provided at two different pose positions within a marshaling zone. During an activation/on-boarding session of the vehicle onto the autonomous marshaling zones, the vehicle receives and stores a marshaling scenario map ("on-boarding marshaling map" hereinafter), which is provided as a matrix grid. An example implementation of an on-boarding process is provided in co-pending application titled SYSTEM AND METHOD OF JOINING AN EXISTING AUTOMATED VEHICLE MARSHALLING CONVOY USING WIRELESS COMMUNICATION, which is commonly owned with the present application and the contents of which are incorporated herein by reference in its entirety.

Figure 5:
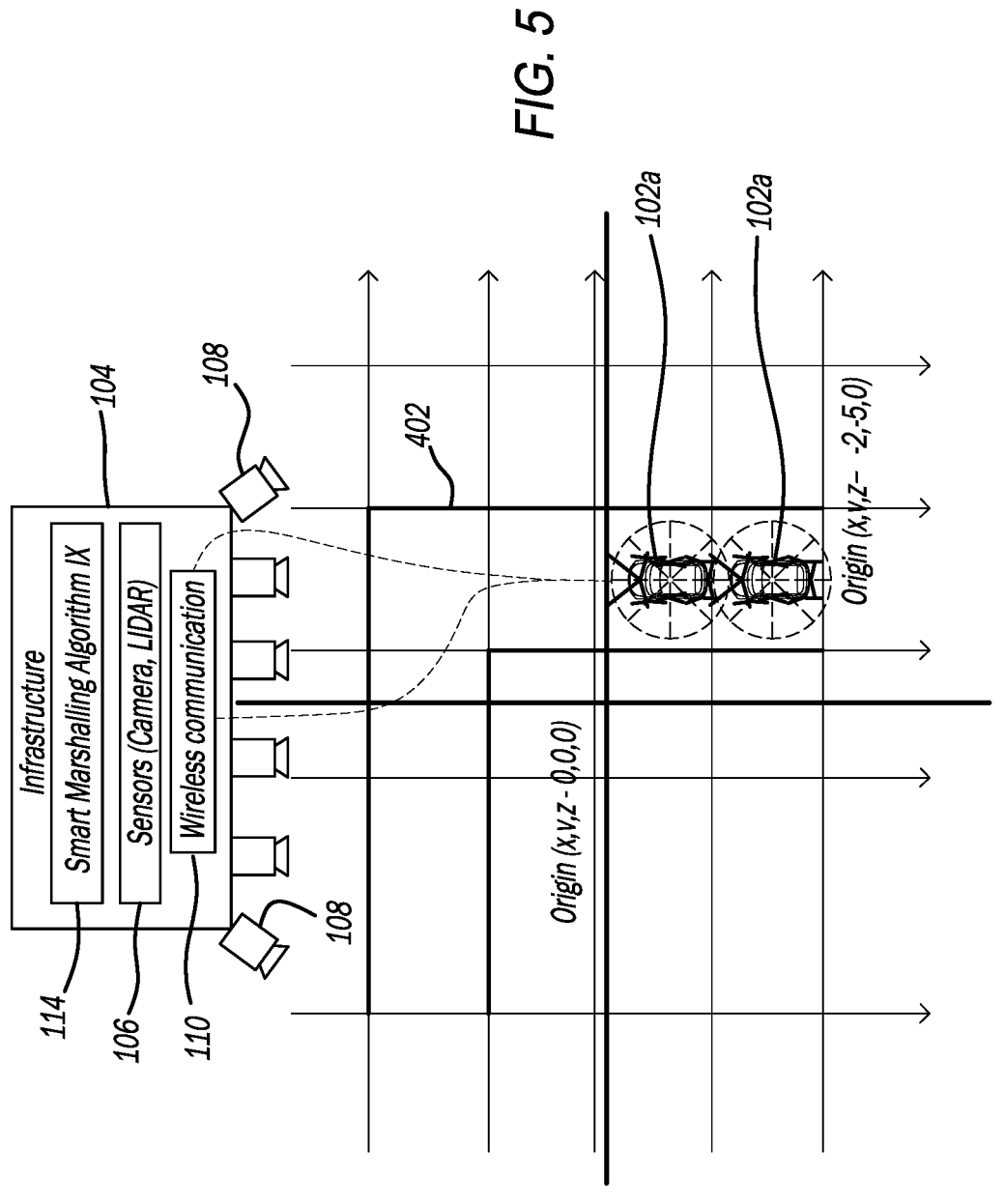

As illustrated in FIG. 5, when the vehicle 102 starts receiving marshaling PCIM instructions (as the vehicle moves along the marshaling route), the vehicle 102 down-selects the respective vehicle instructions (e.g., the vehicle container of PCIM message) and then validates the instructions received over the infrastructure 104 with vehicle's on-board marshaling map via the vehicle's marshaling matching algorithm (e.g., the smart marshaling algorithm 306) regarding the vehicle's pose position. If the pose position information does not match, the vehicle 102 informs the infrastructure 104 of the mismatch instead of abruptly triggering the vehicle side's emergency stop, which could otherwise potentially lead to collisions in the on-going marshaling. If the pose information matches, then the vehicle's marshaling algorithm continue updating the respective vehicle's pose position with respect to the vehicle's marshaling map. In the illustrated example, Position A represents the vehicle's current position as determined by the vehicle's marshaling algorithm and Position B represents the vehicles current position as determined by the infrastructure's marshaling algorithm. In this example, a mismatch exists.

Thus, FIG. 5 illustrates the vehicle receiving the marshaling PCIM instructions, and the smart marshaling algorithm down-selects the respective instructions (i.e., vehicle container of PCIM message). The smart marshaling algorithm then validates the instructions received from the infrastructure system with the on-boarding marshaling map using a pose position of the vehicle. If the pose position does not match, the infrastructure system is informed of the mismatch in lieu of triggering an emergency stop. If the pose position matches, then the vehicle marshaling algorithm continues to update the pose position with respect to the onboarding marshaling map. FIG. 5 illustrates a position of the vehicle as determined by the infrastructure marshaling algorithm and provided by the message from the infrastructure system. Here, the two positions do not match, and thus, the vehicle system may notify the infrastructure system.

Figure 6:
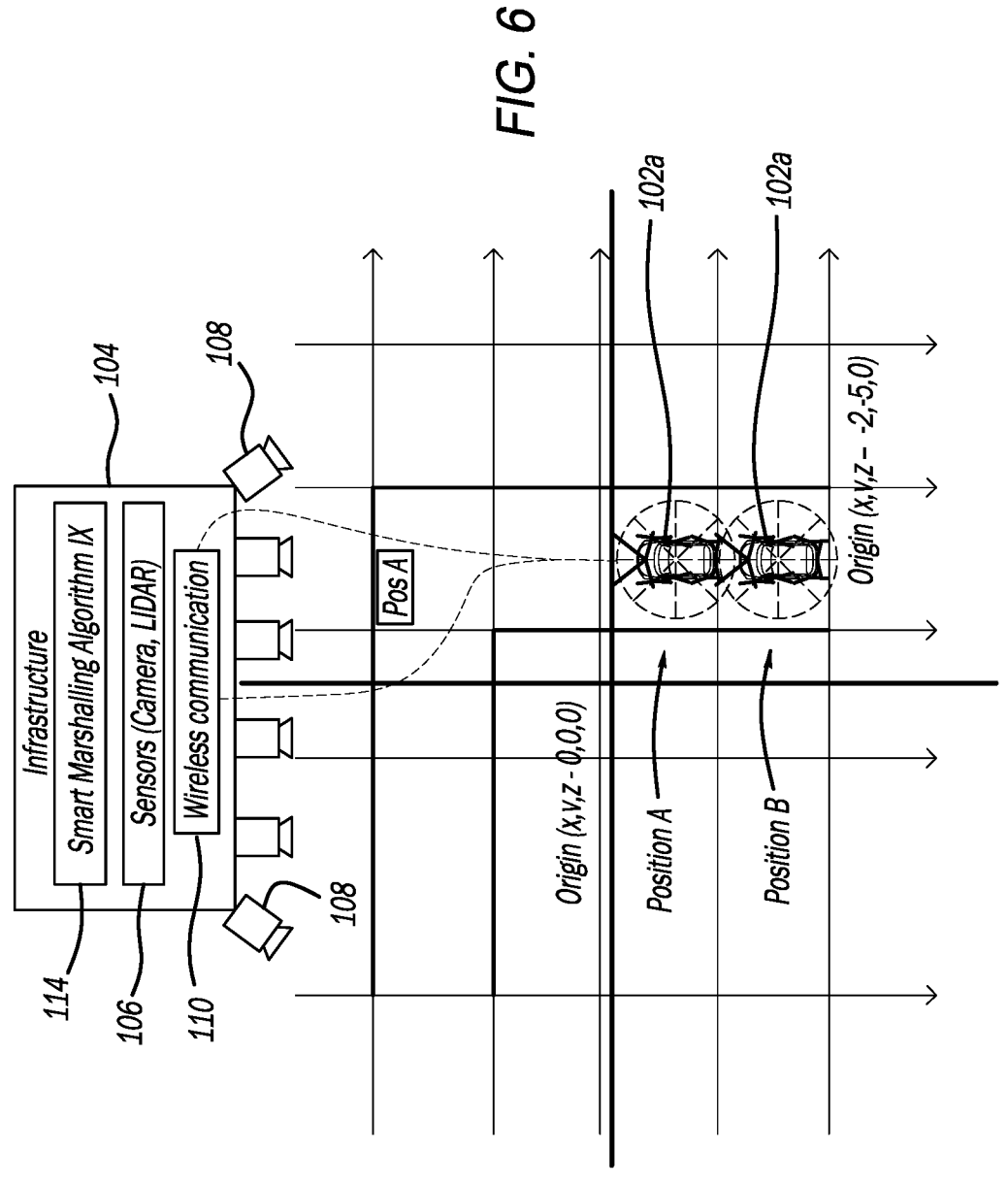

In this example, as illustrated in FIG. 6, the vehicle's marshaling algorithm uses the vehicle's pose position whenever the vehicle's marshaling algorithm does not receive the updated pose position from infrastructure 104, such as because of a wireless or server down delay. In various examples, the vehicle's marshaling algorithm also utilizes other vehicle's pose information and on-board sensors to avoid any collision, such that marshaling movement continues. For example, the marshaling of the vehicle 102a (and other vehicles 102) continues and an e-stop is not triggered until a defined threshold criteria is met. That is, the vehicle 102a does not stop (e.g., trigger the infrastructure or on-boarding supervisor or vehicle's lights flashing) until a threshold, such as based on distance, time, proximity, etc. to other objects (e.g., other vehicles 102) is exceeded. In response to the threshold being exceeded (e.g., exceed maximum stopping distance or time), an e-stop is triggered for collision avoidance.

Thus, in one form, FIG. 6 illustrates the vehicle marshaling algorithm using the pose position of the vehicle when the updated pose position is not received from infrastructure system. In this case, the vehicle marshaling algorithm also uses pose position information of other vehicle(s), which can be provided by PCIM, and on-board sensors to avoid interference with objects such as other vehicles. The vehicle marshaling algorithm also continues to have the vehicle move or marshal and does not trigger the e-stop until the vehicle meets certain threshold criteria to trigger the infrastructure system or an on-boarding supervisor to perform an e-stop. The criteria can be based on distance, time, proximity to other objects reduce or inhibit interference or collision.

Figure 7:
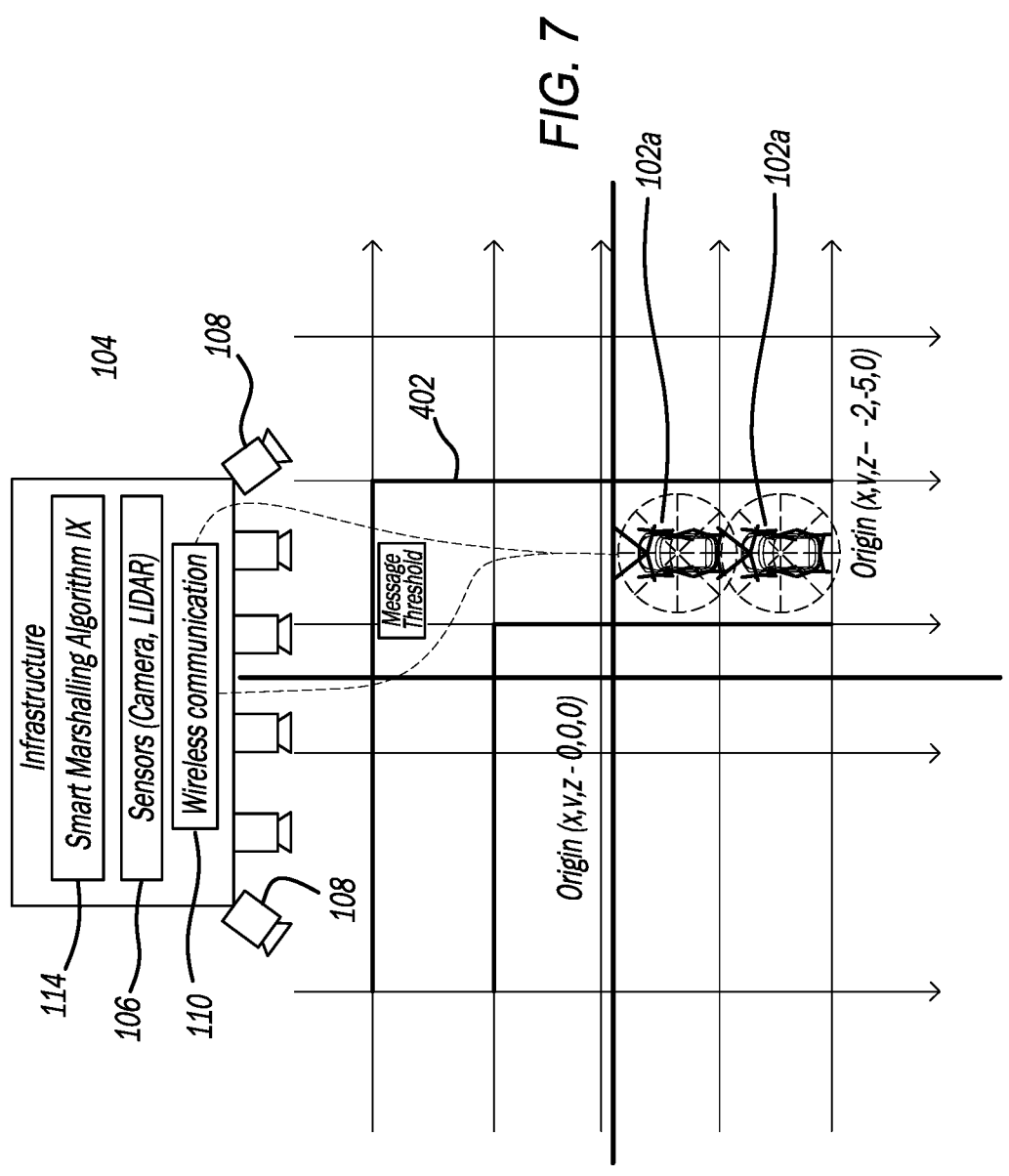

The vehicle's marshaling algorithm then performs a validation and verification of the received emergency e-stop (as shown in FIG. 7) calculated from the vehicle versus calculated by the infrastructure utilizing the PCIM and PCVM wireless communications messages. For example, the vehicle's marshaling algorithm calculates the vehicle's e-stop if it does detect a difference in the pose position information up to a defined threshold of PCIM messages (e.g., does not receive PCIM messages over a defined time period or number of expected messages). In this instance, the vehicle's marshaling algorithm verifies the e-stop received from PCIM, such as, in terms of the time, pose current position, collision metrics calculation, etc.

Thus, FIG. 7 illustrates that the vehicle marshaling algorithm is configured to do the validation and verification of a received emergency e-stop calculated from the vehicle verses calculated by the infrastructure system utilizing the PCIM and PCVM wireless communications messages. The vehicle marshaling algorithm calculates the e-stop for the vehicle if there is a difference in the pose position information up to certain threshold of PCIM messages. The vehicle marshaling algorithm verifies the e-stop received from PCIM or calculated in terms of the time, pose current position, collision metrics calculation etc. If the infrastructure system does not receive confirmation that the vehicle received command and stopped, then the infrastructure system treats the vehicle as an external agent and adjusts commands to other vehicles to avoid potential collisions (e.g., force a larger buffer area or follow distance). If communication is not restored within a given time, or vehicle travels beyond an allowed threshold, the infrastructure system alerts operators.

Figure 8:
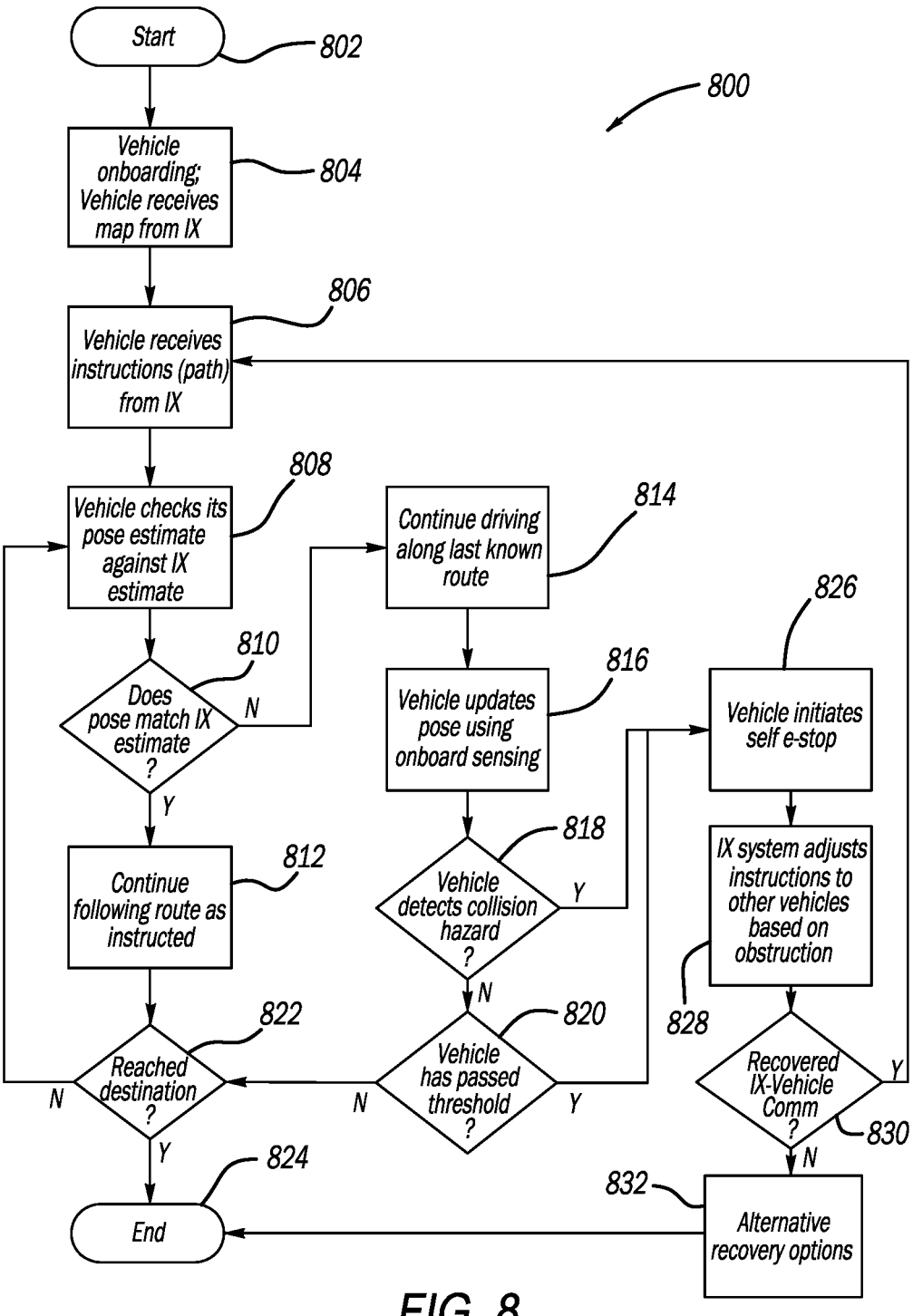
FIG. 8 is a flowchart of an example method executed by a vehicle in accordance with various implementations.

FIG. 8 is a flow chart illustrating an example method 800 for marshaling instruction validation executed by a vehicle (e.g., the vehicle 102) in accordance with various implementations described herein. The method 800 is initiated at operation 802, such as beginning a marshaling operation, wherein a vehicle onboarding is performed at operation 804. For example, one or more marshaling maps are downloaded to the vehicle as described in more detail herein. Instructions are then received by the vehicle from the infrastructure (e.g., the infrastructure 104) at operation 806. For example, instructions relating to a path or marshaling route along a portion of the marshaling maps are received, such as a desired or expected (or estimated) location of the vehicle as determined by an infrastructure smart marshaling algorithm. In some examples, the instructions include a calculated pose position for the vehicle.

In response, the vehicle checks a pose position of the vehicle as determined by the vehicle relative to the calculated pose position (e.g., estimated pose position) received from the infrastructure at operation 808. That is, a determination is made at operation 810 whether the two pose positions (the pose position determined by the vehicle and the pose position estimate from the infrastructure) match. If the pose positions match, then the vehicle continues following the marshaling route at operation 812 as instructed by the infrastructure. If the pose positions do not match, the vehicle continues driving along a last known route at operation 814 and updates the position using onboard sensing (e.g., vehicle onboard sensors) at operation 816. For example, the vehicle uses local sensing to provide pose position (e.g., vehicle position within the marshaling matrix) updates.

A determination is then made whether a collision hazard is detected at operation 818. If no collision hazard is detected, then a determination is made at operation 820 whether the vehicle has passed a threshold. For example, a determination is made whether a time threshold since a last received message has been exceeded. If the threshold has not been exceeded (or if the vehicle has continued along the path at operation 812) then a determination is made at operation whether the destination for the vehicle has been reached. If the destination has been reached, the method ends at operation 824. If. The destination has not been reached, then the vehicle checks the vehicle determined pose position against the infrastructure pose estimate at operation 808.

If a vehicle collision hazard is detected at operation 818 or if the vehicle has exceeded the threshold as determined at operation 820, then the vehicle initiates a self e-stop at operation 826. The infrastructure system then adjusts instructions to other vehicles based on the obstruction at operation 828. For example, the infrastructure broadcasts the e-stop information to other vehicles in the marshaling convoy.

A determination is then made at operation 830 whether communication between the infrastructure and vehicle has recovered or been restored. For example, a determination is made whether messages and/or instructions are again being received by the vehicle from the infrastructure. If the communication has been restored, then the vehicle again receives instructions from the infrastructure at operation 806. If the communication has not been restored, then alternate recovery options are initiated at operation 832 and the method ends at operation 824. The alternate recovery options can include, for example, any troubleshooting or remedial operations to restore the communication between the vehicle and the infrastructure.

Figure 9:
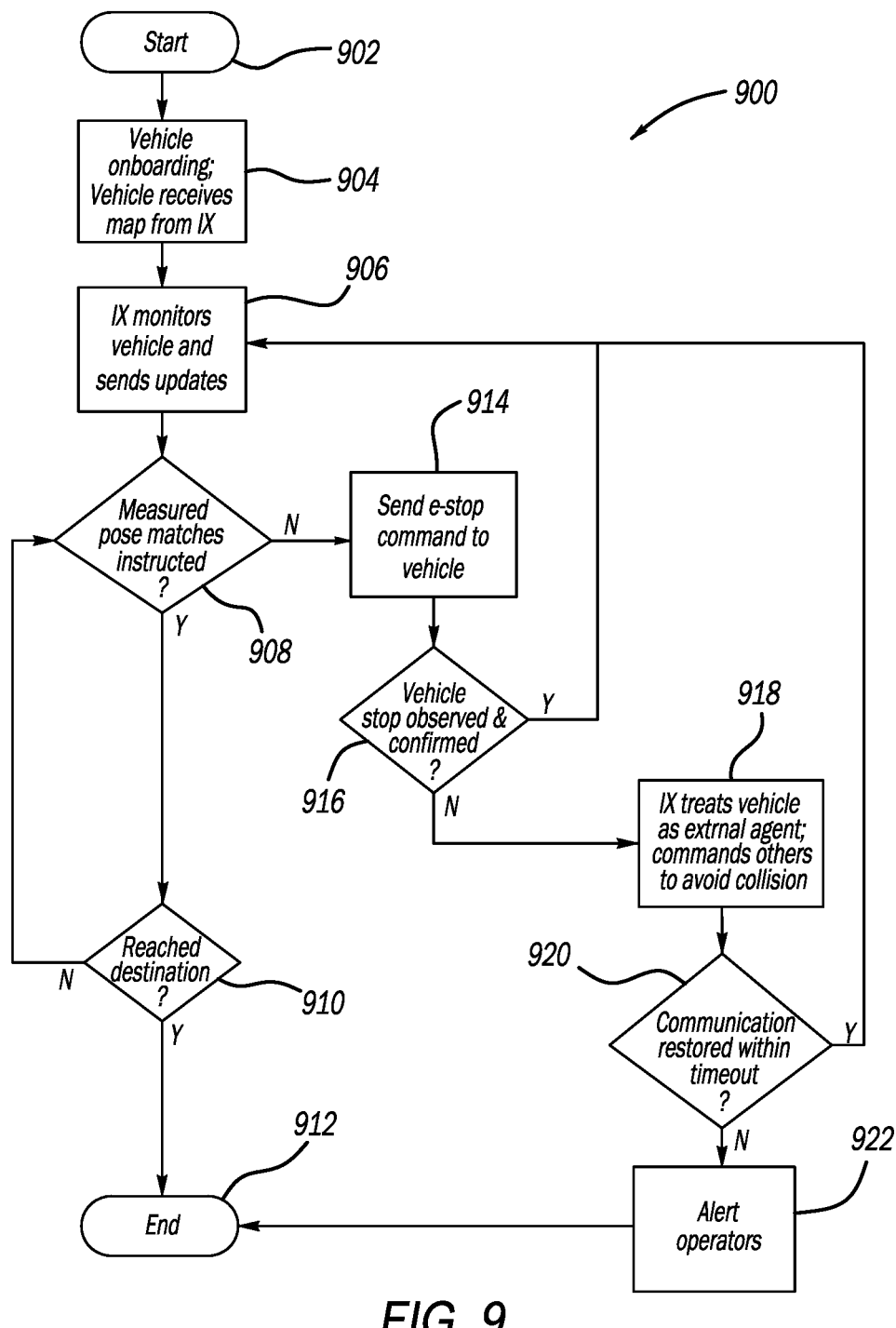
FIG. 9 is a flowchart of an example method executed by an infrastructure system in accordance with various implementations.

FIG. 9 is a flow chart illustrating an example method 900 for marshaling instruction validation executed by an infrastructure (e.g., the infrastructure 104) in accordance with various implementations described herein. The method 900 is initiated at operation 902, such as beginning a marshaling operation, wherein a vehicle onboarding is performed at operation 904. For example, one or more marshaling maps are downloaded to the vehicle as described in more detail herein. The infrastructure then monitors the vehicle and sends updates at operation 906. For example, marshaling movement instructions are sent or updated. A determination is then made at operation 908 whether the pose of the vehicle matches the instructed movement (e.g., along the path). If the measured pose matches the instructed pose, then a determination is made at 910 whether the destination for the vehicle has been reached. If the destination has been reached, then the method ends at 912. If the destination is not reached, then a determination is again made whether the measured pose matches the instructed pose at 908 as the vehicle moves along the marshaled path.

If the measured pose and the instructed poses do not match, then an e-stop command is sent to the vehicle at operation 914 and a determination made whether a vehicle stop is then observed and confirmed at operation 916. For example, a determination is made whether the vehicle has stopped and a confirmation message received from the vehicle by the infrastructure. If the vehicle stop is observed and confirmed, then the infrastructure continues to monitor the vehicle and send updates at operation 906. If the vehicle stop is not observed and confirmed, then the infrastructure treats the vehicle as an external agent at operation 918. And, as such, the infrastructure commands other vehicles to avoid collision. A determination is then made at operation 920 whether communication between the vehicle and the infrastructure has been restored. If communication has not been restored (within a timeout period, such as a define time period), then one or more operators are alerted at operation 922. If communication has been restored (within the timeout period) then the infrastructure continues to monitor the vehicle and send updates at operation 908.

Thus, various examples validate marshaling instructions received by the infrastructure, such that the marshaling system is able to guide vehicles during emergency/non-emergency e-stop.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising: calculating, by a vehicle system of a vehicle, a pose information for the vehicle along a marshaling route defined by a marshaling map; updating, by the vehicle system, a current pose position of the vehicle based on the calculated pose information; determining, by the vehicle system, whether the current pose position for the vehicle matches a calculated pose position for the vehicle received from an infrastructure system; transmitting, in response to a determined mismatch between the current pose position for the vehicle and the calculated pose position for the vehicle, a notification to the infrastructure system; and controlling, by the vehicle system, movement of the vehicle based on the marshaling route until a stop condition is satisfied.

2. The method of claim 1, further comprising, receiving by the vehicle system, a vehicle marshaling map identifying the marshaling route for the vehicle within a marshaling zone and storing the vehicle marshaling map at the vehicle.

3. The method of claim 1, wherein the current pose position is determined, by the vehicle system, using a marshaling algorithm of the vehicle.

4. The method of claim 1, wherein controlling movement of the vehicle in response to a determined mismatch, by the vehicle system, comprises controlling movement of the vehicle along the marshaling route using vehicle pose updates from one or more onboard sensing systems.

5. The method of claim 4, further comprising, in response to a detected collision hazard by the one or more onboard sensing systems, initiating by the vehicle system, a self e-stop.

6. The method of claim 5, wherein the infrastructure system updates control instructions to other vehicles being marshaled along the marshaling route based on the detected collision hazard.

7. The method of claim 4, further comprising controlling movement of the vehicle along the marshaling route using vehicle pose updates from one or more onboard sensing systems in response to not receiving the calculated pose position from the infrastructure system.

8. A system comprising:
an infrastructure system configured to:
transmit a vehicle marshaling map to a vehicle, the vehicle marshaling map defining a marshaling route;
receive pose position updates from the vehicle;
transmit to the vehicle, in response to the received pose position updates not matching an estimated pose position determined by a marshaling algorithm of the infrastructure system, an e-stop command; and
update control commands to other vehicles traveling along the marshaling route in response to a failure to receive confirmation of an e-stop by the vehicle.

9. The system of claim 8, wherein the pose position updates are determined by a vehicle system, using a marshaling algorithm of the vehicle.

10. The system of claim 8, wherein movement of the vehicle along the marshaling route is controlled using vehicle pose updates from one or more onboard sensing systems of the vehicle in response to the pose position updates not matching the estimated pose position determined by the marshaling algorithm of the infrastructure system.

11. The system of claim 10, wherein, in response to a detected collision hazard by the one or more onboard sensing systems, initiating by a vehicle system of the vehicle, a self e-stop.

12. The system of claim 11, wherein the infrastructure system is further configured to update control instructions to other vehicles being marshaled along the marshaling route based on the detected collision hazard.

13. The system of claim 8, wherein the infrastructure system, in response to a continued failure to receive confirmation of the e-stop by the vehicle indicative of a communication failure, transmitting an alert to one or more operators.

14. One or more non-transitory computer-readable media storing processor-executable instructions that, when executed by at least one processor, cause the at least one processor to:
transmit, by an infrastructure system, a vehicle marshaling map to a vehicle, the vehicle marshaling map defining a marshaling route;
receive, by the infrastructure system, pose position updates from the vehicle;
transmit to the vehicle, in response to the received pose position updates not matching an estimated pose position determined by a marshaling algorithm of the infrastructure system, an e-stop command; and
update, by the infrastructure system, control commands to other vehicles traveling along the marshaling route in response to a failure to receive confirmation of an e-stop by the vehicle.

15. The one or more non-transitory computer-readable media of claim 14, wherein the pose position updates are determined by a vehicle system, using a marshaling algorithm of the vehicle.

16. The one or more non-transitory computer-readable media of claim 14, wherein movement of the vehicle along the marshaling route is controlled using vehicle pose updates from one or more onboard sensing systems of the vehicle in response to the pose position updates not matching the estimated pose position determined by the marshaling algorithm of the infrastructure system.

17. The one or more non-transitory computer-readable media of claim 16, wherein, in response to a detected collision hazard by the one or more onboard sensing systems, initiating by a vehicle system of the vehicle, a self e-stop.

18. The one or more non-transitory computer-readable media of claim 17, wherein the processor-executable instructions, when executed by the at least one processor, cause the infrastructure system to update control instructions to other vehicles being marshaled along the marshaling route based on the detected collision hazard.

19. The one or more non-transitory computer-readable media of claim 14, wherein the processor-executable instructions, when executed by the at least one processor, cause the infrastructure system to, in response to a continued failure to receive confirmation of the e-stop by the vehicle indicative of a communication failure, transmit an alert to one or more operators.

20. The one or more non-transitory computer-readable media of claim 14, wherein the processor-executable instructions, when executed by the at least one processor, cause the infrastructure system to determine the estimated pose position of the vehicle using one or more infrastructure sensors within a marshaling zone.

* * * * *